United States Patent [19]

Harris

[11] Patent Number: 4,494,990

[45] Date of Patent: Jan. 22, 1985

[54] CEMENTITIOUS COMPOSITION

[75] Inventor: Harry A. Harris, Leawood, Kans.

[73] Assignee: Ash Grove Cement Company, Overland Park, Kans.

[21] Appl. No.: 510,636

[22] Filed: Jul. 5, 1983

[51] Int. Cl.$^3$ ................................................. C04B 7/35
[52] U.S. Cl. ........................................ 106/90; 106/98; 106/110; 106/111; 106/117
[58] Field of Search ................. 106/98, 110, 111, 117, 106/90

[56] References Cited

U.S. PATENT DOCUMENTS

| | | | |
|---|---|---|---|
| 1,255,236 | 2/1918 | Schweimler et al. | 106/110 |
| 2,362,060 | 11/1944 | Etridge et al. | 106/117 |
| 3,411,924 | 11/1968 | Lapshin | 106/110 |
| 3,565,648 | 2/1971 | Mori et al. | 106/117 |
| 3,582,376 | 6/1971 | Ames | 106/110 |
| 3,847,635 | 11/1974 | Lange et al. | 106/110 |
| 4,067,939 | 1/1978 | Lowe et al. | 106/110 |

*Primary Examiner*—James Poer
*Attorney, Agent, or Firm*—Kokjer, Kircher, Bradley, Wharton, Bowman & Johnson

[57] ABSTRACT

An improved cementitious composition is the subject of the present invention. The composition comprises 25-60 weight percent cement component. The cement component is 3 to 50 weight per pozzolan. The pozzolan should have a sulfate reactivity factor of no greater than 12 utilizing a function obtained from the Dunstan formula. The composition is 40 to 75 percent by weight alpha gypsum (calcium sulfate hemihydrate). Various additives may be included to enhance the performance of the composition. These include polymer modifiers, a water reducing agent, a set retarding agent and a set accelerating agent.

9 Claims, No Drawings

CEMENTITIOUS COMPOSITION

BACKGROUND

This invention relates generally to cementitious compositions and, more particularly, to an improved composition particularly useful as a pavement patching compound.

It is known that a major factor in the long term deterioration of concrete is the formation of ettringite. This occurs as a result of the reaction of tricalcium aluminate (3CaO.Al$_2$O$_3$) (abbreviated C$_3$A) present in Portland cement with sulfate. The ettringite causes an increase in the volume or length of the concrete which, of course, results in splitting, cracking, and even crumbling. While mixtures of Portland cement and calcium sulfate hemihydrate (commonly called alpha gypsum) have previously been used and are in some cases advantageous, the interaction between the C$_3$A and the sulfate from alpha gypsum has greatly limited the use of such mixtures. Their application has been primarily as "quick patches" the long term durability of which has been notoriously poor. To reduce ettringite formation in such mixtures and thus improve concrete life and durability others have proposed utilizing Portland cement with low tricalcium aluminate content. Such an approach is the subject of U.S. Pat. No. 3,852,081, the disclosure of which is expressly incorporated herein by reference.

It is also known that some types of cements containing pozzolan offer superior sulfate resistance. It has not heretofore been known, however, that a combination of moderate to high C$_3$A containing cement together with alpha gypsum and pozzolan would offer a product having properties equal to or exceeding those cements having low tricalcium aluminate and alpha gypsum. The result is particularly unexpected because the sulfate present with high C$_3$A content cement would be expected to show poor durability.

SUMMARY OF THE INVENTION

It has been discovered that by including pozzolan in a Portland cement-alpha gypsum material, or by utilizing a cement containing pozzolan and alpha gypsum material, an improved cementitious composition is obtained. The improved product has performance characteristics comparable or exceeding those of low C$_3$A containing cements with alpha gypsum yet is considerably more economical. The composition may also be utilized with latex polymers for enhanced bonding characteristics, as well as water reducers, set accelerators and set retarders. The advantages of the composition of the invention are attributable, in part, to the fact that for the first time, a substituent of the cementitious formulation acts to block interaction between the C$_3$A and the sulfate from gypsum.

OBJECTS OF THE INVENTION

It is, therefore, a primary object of the present invention to provide an improved cementitious composition which has superior sulfate resistance but is not limited to the use of cements having low tricalcium aluminate content.

An important aim of the invention is to provide an improved cementitious composition which can be prepared in powdered form with all components admixed thereby facilitating handling, transportation and storage.

Another object of this invention is to provide an improved cementitious composition of the type described that is compatible with latex modifiers which can be used to improve the bonding characteristics of the material.

It is another aim of the invention to provide an additive for cement which can be used with all types of portland cement to improve its life and durability by reducing its reactivity with sulfate.

A further object of my invention is an improved cementitious composition of the type described in the foregoing aims and objects which is compatible with other cement additives such as water reducers, set retarders and set accelerators.

An aim of the invention is to provide a cementitious composition including both cement and alpha gypsum but which also includes a substituent to prevent interaction between the gypsum and C$_3$A in the cement.

Other objects of the invention will be made clear or become apparent from the following description and claims.

DETAILED DESCRIPTION OF THE INVENTION

While any of types I, II, III, IV or V Portland cement (according to ASTM standards) can be utilized in the formulation of the present invention, types I and II are preferred. Portland cement is combined with pozzolan to provide a cement component that is 3-50% by weight pozzolan. Blended cements (as defined by ASTM standards) can also be utilized provided their pozzolan content is within the range stated. In either case, the pozzolan should be characterized by a sulfate reactivity factor of no greater than 12, as hereinafter defined.

The resistance of mortars and concrete to sulfate attack is discussed by Edwin R. Dunstan, Jr., in his publication "A Specification Odyssey—Sulfate Resistant Concrete For the 80's" presented at the Verbeck Memorial Symposium on Sulfate Resistance, American Concrete Institute, 1980 (published by the U.S. Dept. of the Interior). This publication is expressly incorporated herein by reference. The cited article describes sulfate resistance ($F_{SR}$) of concrete exposed to sulfate solutions to be a function of the following formula:

$$F_{SR} = S\left[\frac{W/(c+b)}{.52}\right][C_4AF + C_3A]K_b$$

where

S = severity level of the sulfate attack in units from 1 to 5. 1 = no sulfate exposure. 5 = very severe sulfate exposure. Each unit increase represents approximately a ten fold increase in concentration.

W = weight of water c+b = weight of cement plus blended material or pozzolan.

C$_4$AF = weight percent of tetracalcium aluminoferrate (4CaOAl$_2$O$_3$Fe$_2$O$_3$)

C$_3$A = weight percent of tricalcium aluminate (3CaOAl$_2$O$_3$)

$K_b = 1+(\text{Sin}R_v)-\text{Sin}(R_v-0.9Pb)$ where $R_v = 4.5(\text{CaO}-5/\text{Fe}_2\text{O}_3)$ and CaO = weight percent of CaO present $F_2O_3$ = weight percent of $Fe_2O_3$ present
Pb = weight percent of pozzolan to cement and gypsum in the material being tested Manifestly, the foregoing test to determine $F_{SR}$ is applied to blended cement even though the "sulfate reactivity factor" applicable to the composition of the present invention is applied to the pozzolan component. Where pozzolan alone is to be evaluated it is blended with cement to permit evaluation according to the stated formula. For purposes of the present invention it has been found that the value of the component $[C_4AF + C_3A] K_b$ is critical in determining the suitability of the pozzolan for inclusion in the composition of the invention. The component set forth above has been designated the "sulfate reactivity factor" for purposes of the present application. As indicated, this factor should have a value of 12 or less in the compositions of the invention.

The cement component as above defined constitutes approximately 25 to 60 weight percent of the composition according to the present invention and the remaining 40 to 75% by weight is calcium sulfate hemihydrate (alpha gypsum).

If pozzolan is added as a separate component rather than as a blended cement, it should, as previously indicated, have a sulfate reactivity factor of no greater than 12. The most effective, and thus preferred pozzolans, are also those with a high degree of fineness, high silica content and a high degree of amorphousness of the silica. Some naturally occurring pozzolans are acceptable as is blast furnace slag and silica fume. Another acceptable source of pozzolan is fly ash. Fly ash having the desirable properties indicated will generally conform to ASTM Type F as given under ASTM specification C-618. Fly ash conforming to this specification will have a minimum silica dioxide plus aluminum oxide plus iron oxide composition of 70% by weight.

It is well known in the art to utilize latex or other polymer modifiers to improve the performance of cementitious compositions. Such a modifier will improve bonding characteristics as well as durability. A preferred latex modifier for use in the composition of the present invention is a powdered acrylic latex sold under the trademark ACRYLOID MC-46 by Rohm and Haas Company of Philadelphia, Pennsylvania. Other suitable latex modifiers include liquid emulsion acrylics, styrene-butadiene copolymer, and polyvinyl acetate. Other polymer materials compatible with Portland cement can be used as modifiers. These include expoxies, polyesters and methyl methacrylate. The Portland cement compatible modifier is incorporated into the composition of the present invention in a quantity of from about 2 to 20%, by weight, based on the combined weight of the cement and pozzolan.

It may also be desirable to incorporate a water reducing agent in the formulation according to known techniques. A suitable water reducing agent is a highly polymerized naphthalene sulfonate sold under the trademark LOMAR D by Diamond Shamrock Corporation of Morristown, New Jersey. Other suitable water reducers which are Portland cement compatible include sulfonate condensates of formaldehyde; and arabic gum (acacia gum). The water reducing agent is incorporated into the formulation in a quantity from about 0.3 to 4% by weight, based on the total weight by the dry ingredients.

If it is desired to control the setting time of the composition this can be accomplished by adding set retarders and set accelerators as is known in the art. A typical set retarder, compatible with Portland cement, is sodium citrate and a typical accelerator is potassium or aluminum sulfate. It is known to use both a retarder and an accelerator together for close control of setting time. The set accelerator or retarder will each be present in a quantity up to 1.0% by weight, based on the weight of the cement component.

The following examples are representative of the formulation and comparative advantages of the present invention:

EXAMPLE NO. 1

A blend of cementitious materials was formulated by dry blending 50% alpha gypsum, 45% Type I Portland cement, 5% silica fume (as a pozzolan source), with 1.5% water reducing and 0.15% set controlling agents (all percentages are by weight according to the procedure previously described) to produce the improved cementitious materials shown as Formulation No. 1 in Table No. 1. This cement was then mixed with fine aggregate to prepare a mortar used to cast 2" motar cubes to evaluate strength gain over a time lapse of 28 days. A second cementitious material was prepared by dry blending 50% alpha gypsum and 50% Type I cement with water reducing and set controlling agents. This is shown as Formulation No. 2 in Table No. 1. This second cement was similarly prepared as a mortar with the addition of sand and cast in 2" cubes for compressive strength development over the same 28 day period. A third mortar was prepared by the addition of only Type I cement and sand and again cast in 2" cubes to measure strength development, this is shown as Formulation No. 3 in Table No. 1. The results for evaluation of compressive strength for each of Formulation 1, 2, and 3 are set forth in Table No. 1

TABLE NO. 1

| Formulation | Elapsed Time | Compressive Strength (psi) |
|---|---|---|
| No. 1 | 3 Hrs. | 800 |
| | 24 Hrs. | 4260 |
| | 7 Days | 7220 |
| | 28 Days | 8280 |
| No. 2 | 3 Hrs. | 750 |
| | 24 Hrs. | 3610 |
| | 7 Days | 6960 |
| | 28 Days | 7560 |
| No. 3 | 3 Hrs. | — |
| | 24 Hrs. | 1420 |
| | 7 Days | 4080 |
| | 28 Days | 5600 |

As seen in Table No. 1, the improved cementitious blend of Formulation No. 1 indicates an acceptional strength development for the complete time period of this test program. It should be specifically noted that the compressive strength development for a 3 hr. time period could not be obtained on the Type I cement, of Formulation No. 3 since this was prior to the final setting time of normal Portland cement of this type.

EXAMPLE NO. 2

Aliquotes of the mortars from Formulations number 1, 2 and 3 in Example No. 1, were cast in 1"×1"×10" prisms for the measurement of expansion under an accelerated testing program. These 1"×1"×10" prism specimens were moisture cured and removed from their casting molds after 24 hours, then placed in a 100° F. moist curing chamber for the development of expansive potentials. The specimens were removed from the curing chamber and allowed to cool to ambient conditions prior to measurement of expansion at 7 day intervals. After each 7 day expansive measurement, the specimens were again returned to the 100° moist curing chamber. The expansive development of these prisms will be shown in Table No. 2.

TABLE NO. 2

| Formulation | Elapsed Time | Expansion (in %) |
|---|---|---|
| No. 1 | 7 Days | 0.008 |
| | 14 Days | 0.006 |
| | 21 Days | 0.006 |
| | 28 Days | 0.006 |
| No. 2 | 7 Days | 0.020 |
| | 14 Days | 0.026 |
| | 21 Days | 0.030 |
| | 28 Days | 0.040 |
| No. 3 | 7 Days | 0.006 |
| | 14 Days | 0.006 |
| | 21 Days | 0.010 |
| | 28 Days | 0.011 |

As seen in Table No. 2, the expansive development of formulation No. 1 was nil while that of Formulation No. 2 indicates significant and continued expansion over the 28 day period of this test program. The expansive developments of Formulation No. 3 while greater than was found for Formulation No. 1 were still not significant since the availability of excessive sulfate for such expansion was not present.

The composition according to the present invention will find application for structural concrete, concrete paving and as a concrete patching compound. It may also be utilized as a fire protection coating, mixed with expanders for use as an insulator and in "shot crete" applications.

Since the composition according to the present invention may be admixed in powdered form, no special equipment is required for storage or mixing. Industry standard paper bags may be utilized for packaging, transport and storage. This is particularly advantageous when working with a latex modifier since with many compositions of the prior art the latex polymer had to be emulsified in a water base and carefully stored so as not to encounter separation of the emulsion components. When a powdered latex is utilized according to the present invention, these problems are completely eliminated. The ability to produce the material according to the invention in powdered form also makes it readily adaptable for use as an additive to Portland cement.

The composition according to the invention has been found to exhibit considerable strength and durability, not only against internal or external sulfate deterioration, but also relative to alkali-silicate reactions, freeze-thaw deterioration and moisture penetration. The exact quantity of pozzolan and other components of the composition according to the invention will be determined according to the particular conditions which are being encountered and in some cases this may need to be determined on an emperical basis.

I claim:
1. A cementitious composition comprising:
    about 25-60 weight percent of a cement component selected from the group comprising Type I and Type II portland cement, said cement component comprising about 3-50 weight percent pozzolan having a sulfur reactivity factor of 12 or less;
    about 40 to 75 weight percent calcium sulfate hemihydrate; and
    about 1 to 20% by weight of a compatible polymer modifier, based on the weight of said cement component.
2. A cementitious composition as set forth in claim 1, wherein is included an effective quantity of a compatible water reducing agent.
3. A cementitious composition as set forth in claim 1 wherein is included an effective quantity of a compatible set retarding agent.
4. A cementitious composition as set forth in claim 3, wherein is included an effective quantity of a compatible set accelerating agent.
5. A cementitious composition as set forth in claim 4, wherein is included about 0.3 to 2 weight percent water reducer, based on the total weight of the dry components.
6. A cementitious composition as set forth in claim 5, wherein is included up to about 0.5 weight percent of a set retarding agent, based on the quantity of said cement component and up to about 0.5 weight percent of a set accelerating agent, based on the quantity of said cement component.
7. An additive for either of Type I and Type II portland cement to increase the life and durability of said cement, said additive comprising:
    about 3-50 weight percent pozzolan, relative to the weight of said cement,
    said pozzolan having a sulfur reactivity factor of twelve or less;
    about 50-97 weight percent calcium sulfate hemihydrate, relative to the combined weight of said portland cement and said pozzolan; and
    about 2 to 40 weight percent of a compatible polymer modifier, based on the combined weight of said pozzolan and said cement.
8. An additive as set forth in claim 7, wherein is included about 0.3 to 4 weight percent water reducer, based on the total weight of the dry components.
9. An additive as set forth in claim 8, wherein is included up to about 1.0 weight percent of a set retarding agent, based on the combined weight of said cement and said pozzolan and up to about 1.0 weight percent of a set accelerating agent, based on the combined weight of said cement and said pozzolan.

* * * * *